United States Patent
Li et al.

(10) Patent No.: US 11,569,869 B2
(45) Date of Patent: Jan. 31, 2023

(54) TRANSCEIVING CIRCUIT

(71) Applicant: Realtek Semiconductor Corporation, Hsinchu (TW)

(72) Inventors: Huan-Chun Li, Hsinchu (TW); Chun-Ching Chan, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 0 days.

(21) Appl. No.: 17/373,865

(22) Filed: Jul. 13, 2021

(65) Prior Publication Data

US 2022/0190878 A1 Jun. 16, 2022

(30) Foreign Application Priority Data

Dec. 16, 2020 (TW) ................................. 109144556

(51) Int. Cl.
*H04B 7/00* (2006.01)
*H02H 9/04* (2006.01)

(52) U.S. Cl.
CPC .............. *H04B 7/00* (2013.01); *H02H 9/045* (2013.01)

(58) Field of Classification Search
CPC ................................. H04B 7/00; H02H 9/045
See application file for complete search history.

(56) References Cited

U.S. PATENT DOCUMENTS

| 9,054,751 | B2 | 6/2015 | Mo et al. |
| 9,300,352 | B2 | 3/2016 | Brinkhoff et al. |
| 9,502,168 | B1* | 11/2016 | Ler ........................ H01L 23/64 |
| 9,934,176 | B2* | 4/2018 | Wang ..................... G06F 13/287 |
| 2005/0118974 | A1* | 6/2005 | Kato ........................ H04B 1/44 455/277.1 |
| 2005/0233706 | A1* | 10/2005 | Takeda .................... H04B 1/46 455/73 |
| 2009/0291645 | A1* | 11/2009 | Chu ......................... H04B 1/48 455/78 |
| 2012/0188849 | A1* | 7/2012 | Matsuda .............. G10K 11/341 367/135 |
| 2013/0034088 | A1* | 2/2013 | Joshi .................... H04B 7/2643 370/337 |
| 2017/0359097 | A1* | 12/2017 | Uchida ................. H01L 23/552 |
| 2021/0119762 | A1* | 4/2021 | Hung ....................... H04L 5/18 |

FOREIGN PATENT DOCUMENTS

GB 2474693 A * 4/2011 ............... H04B 1/40

* cited by examiner

*Primary Examiner* — Jean B Corrielus
(74) *Attorney, Agent, or Firm* — Tim Tingkang Xia, Esq.; Locke Lord LLP

(57) ABSTRACT

A transceiving circuit includes a first transmitting circuit, a first receiving circuit, a first switching circuit and a processing circuit. The first transmitting circuit includes a first inductor and a second inductor, wherein the second inductor is coupled between a first node and a second node, and an end of the first inductor is coupled to the second node. The first receiving circuit is coupled to a third node. The first switching circuit is configured to conduct or block the first node and the third node. When the transceiving circuit is operated in a transmitting mode, the processing circuit is configured to control the first switching circuit to disconnect the first node with the third node. When the transceiving circuit is operated in a receiving mode, the processing circuit is configured to control the first switching circuit to connect the first node with the third node.

20 Claims, 6 Drawing Sheets

TRANSCEIVING CIRCUIT

CROSS-REFERENCE TO RELATED APPLICATION

This application claims priority to Taiwan Application Serial Number 109144556, filed Dec. 16, 2020, which is herein incorporated by reference in its entirety.

BACKGROUND

Field of Invention

This disclosure relates to a transceiving circuit, and in particular to a transceiving circuit applied to high speed input/output interfaces.

Description of Related Art

In the application of conventional high speed input/output interfaces, the operations for transmitting and receiving signal are usually performed by two independent circuits (e.g., a transmitting circuit and a receiving circuit). However, some new integrated USB type-C and DP (Display Port) applications require the transmitting circuit and the receiving circuit to share the same channel. It is difficult to meet such requirement with the structure of the conventional arts.

SUMMARY

An aspect of present disclosure relates to a transceiving circuit. The transceiving circuit includes a first transmitting circuit, a first receiving circuit, a first switching circuit and a processing circuit. The first transmitting circuit includes a first inductor and a second inductor, wherein the second inductor is coupled between a first node and a second node, and an end of the first inductor is coupled to the second node. The first receiving circuit is coupled to a third node. The first switching circuit is coupled to the first transmitting circuit through the first node and coupled to the first receiving circuit through the third node, wherein the first switching circuit is configured to connect or disconnect the first node with the third node. The processing circuit is coupled to the first transmitting circuit, the first receiving circuit and the first switching circuit. When the transceiving circuit is operated in a transmitting mode, the processing circuit is configured to control the first switching circuit to disconnect the first node with the third node. When the transceiving circuit is operated in a receiving mode, the processing circuit is configured to control the first switching circuit to connect the first node with the third node.

DETAILED DESCRIPTION

The embodiments are described in detail below with reference to the appended drawings to better understand the aspects of the present disclosure. However, the provided embodiments are not intended to limit the scope of the disclosure, and the description of the structural operation is not intended to limit the order in which they are performed. Any device that has been recombined by components and produces an equivalent function is within the scope covered by the disclosure.

The terms used in the entire specification and the scope of the patent application, unless otherwise specified, generally have the ordinary meaning of each term used in the field, the content disclosed herein, and the particular content.

The terms "coupled" or "connected" as used herein may mean that two or more elements are directly in physical or electrical contact, or are indirectly in physical or electrical contact with each other. It can also mean that two or more elements interact with each other.

Figure 1:
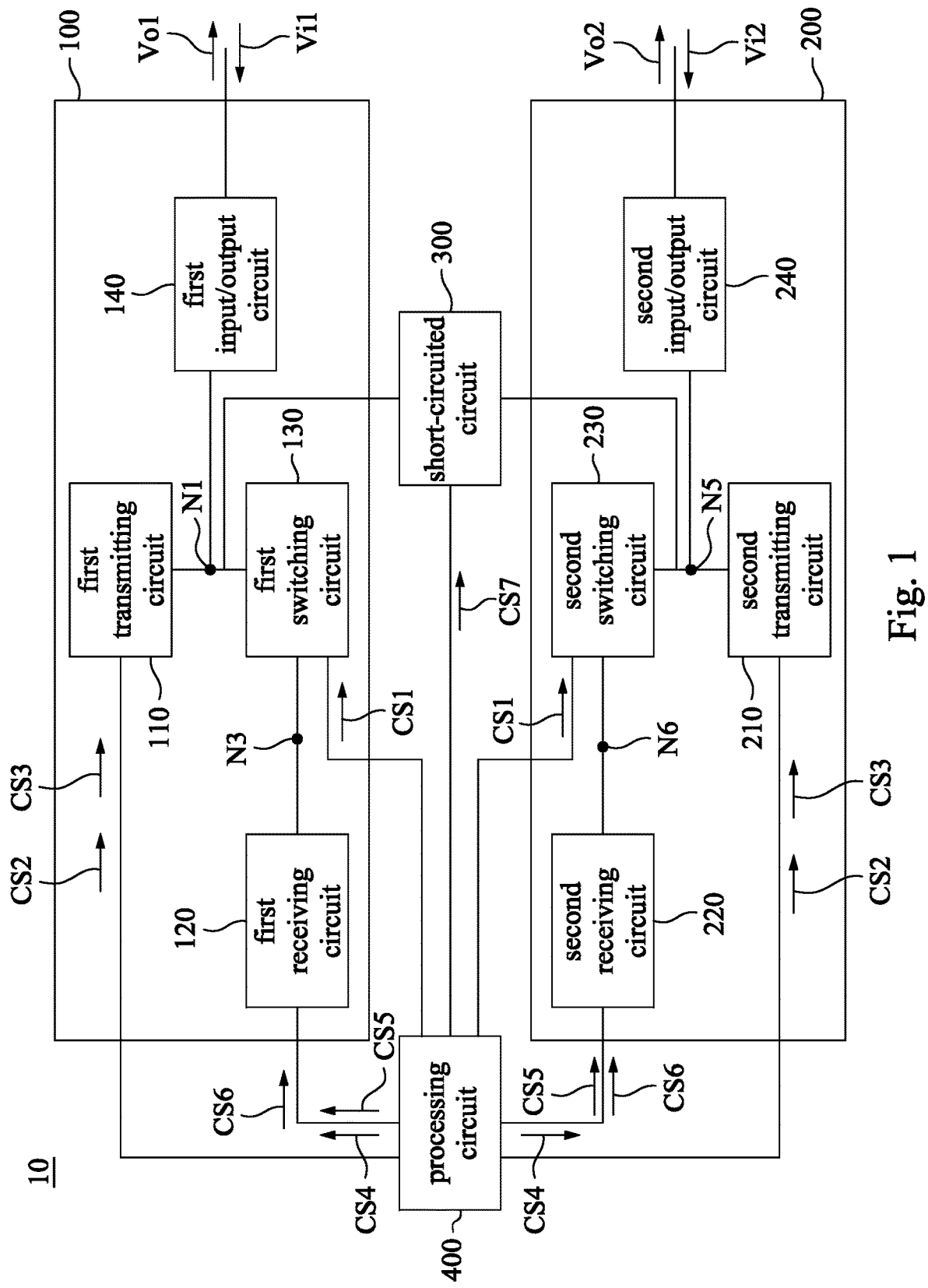
FIG. 1 is a block diagram of the transceiving circuit in accordance with some embodiments of the present disclosure.

Referring to FIG. 1, an embodiment of the present disclosure relates to a transceiving circuit 10. The transceiving circuit 10 includes a positive end circuit 100, a negative end circuit 200, a short-circuited circuit 300 and a processing circuit 400. The transceiving circuit 10 can receive a differential input signal (including a first input signal Vi1 and a second input signal Vi2) from the external of the transceiving circuit 10 by the positive end circuit 100 and the negative end circuit 200, or can transmit a differential output signal (including a first output signal Vo1 and a second output signal Vo2) to the external of the transceiving circuit 10.

In structure, the positive end circuit 100 includes a first transmitting circuit 110, a first receiving circuit 120, a first switching circuit 130 and a first input/output (I/O) circuit 140. The first switching circuit 130 is coupled to the first transmitting circuit 110 at a node N1 and is coupled to the first receiving circuit 120 at a node N3. The first switching circuit 130 is configured to conduct or block the electrical connection between the node N1 and the node N3. The first I/O circuit 140 is coupled to the node N1 and is configured to receive the first input signal Vi1 or transmit the first output signal Vo1.

The negative end circuit 200 includes a second transmitting circuit 210, a second receiving circuit 220, a second switching circuit 230 and a second I/O circuit 240. The second switching circuit 230 is coupled to the second transmitting circuit 210 at a node N5 and is coupled to the second receiving circuit 220 at a node N6. The second switching circuit 230 is configured to conduct or block the electrical connection between the node N5 and the node N6. The second I/O circuit 240 is coupled to the node N5 and is configured to receive the second input signal Vi2 or transmit the second output signal Vo2.

The processing circuit 400 is coupled to the first transmitting circuit 110, the first receiving circuit 120, the first switching circuit 130, the second transmitting circuit 210, the second receiving circuit 220, the second switching circuit 230 and the short-circuited circuit 300. One end of the short-circuited circuit 300 is coupled between the node N1 and the first switching circuit 130, and another end of the short-circuited circuit 300 is coupled between the node N5 and the second switching circuit 230. The short-circuited circuit 300 is configured to conduct or block the electrical connection between the node N1 of the positive end circuit 100 and the node N5 of the negative end circuit 200.

FIGS. 2-6 illustrate the equivalent circuit diagram of the transceiving circuit 10. Since the structure of the negative end circuit 200 is similar to those of the positive end circuit 100 (e.g., mirror reflection), FIGS. 2-6 illustrate the positive end circuit 100 and the short-circuited circuit 300 only and omit the detail of the negative end circuit 200 for the purpose of simplifying description.

Figure 2:
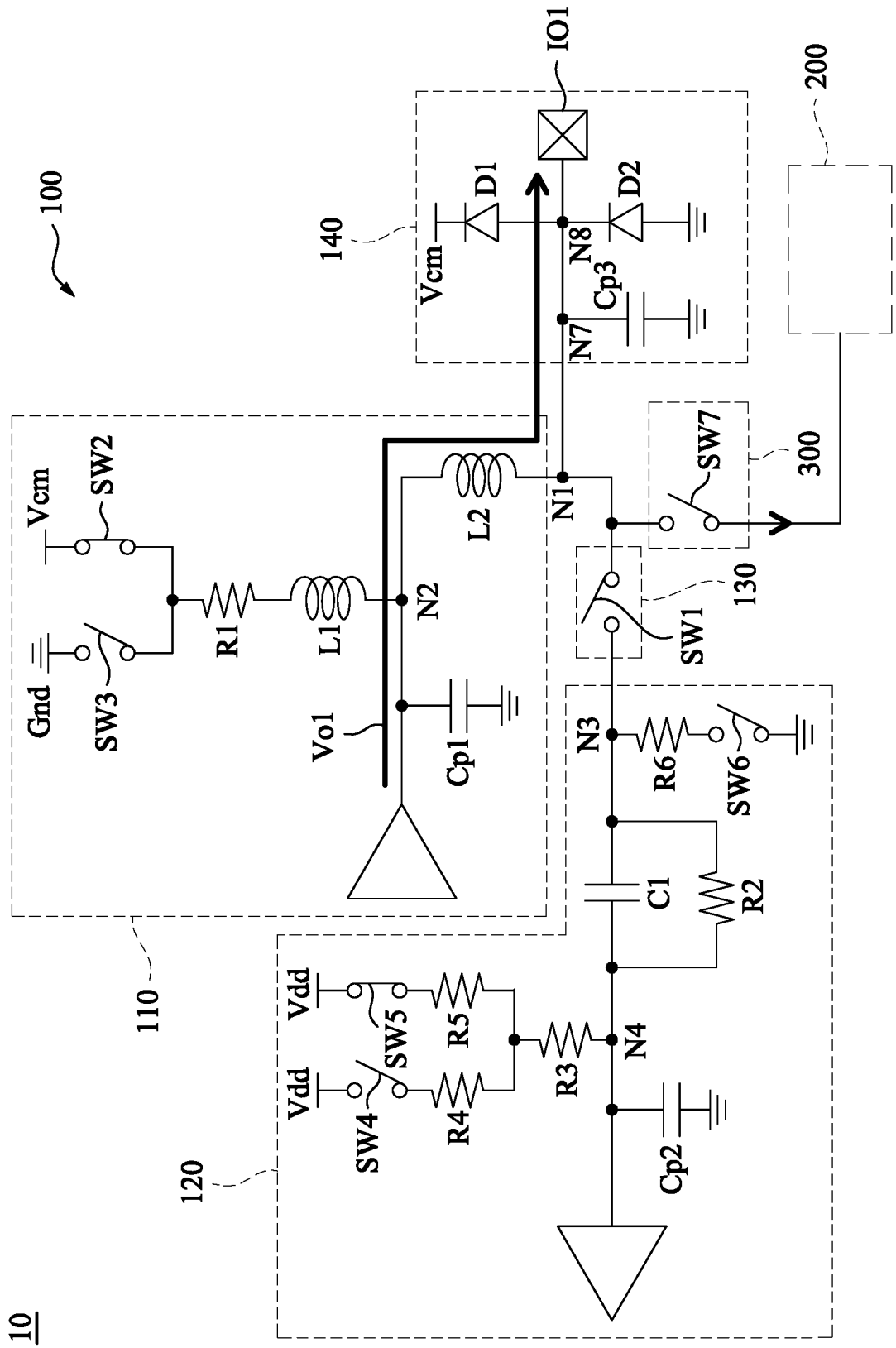
FIG. 2 is an equivalent circuit diagram of the transceiving circuit operated in a transmitting mode in accordance with some embodiments of the present disclosure.

Referring to FIG. 2, the first switching circuit 130 includes a switching unit SW1. The switching unit SW1 is configured to be selectively turned on according to a control signal CS1 (as shown in FIG. 1) emitted by the processing circuit 400, so as to conduct or block the node N1 and the node N3.

The first transmitting circuit 110 includes a first inductor L1, a second inductor L2, a resistor R1, a switching unit SW2, a switching unit SW3 and a parasitic capacitor Cp1. The second inductor L2 is coupled between the node N1 and a node N2, and the first inductor L1 is coupled between the node N2 and the resistor R1. The switching unit SW2 is coupled between the resistor R1 and a common mode voltage Vcm (e.g. 500 mV) and is configured to be selectively turned on according to a control signal CS2 (as shown in FIG. 1) emitted by the processing circuit 400. The switching unit SW3 is coupled between the resistor R1 and a ground voltage Gnd and is configured to be selectively turned on according to a control signal CS3 (as shown in FIG. 1) emitted by the processing circuit 400. The parasitic capacitor Cp1 is coupled between the node N2 and the ground voltage Gnd.

The first receiving circuit 120 includes a resistor R2, a first capacitor C1, a first bias circuit (the structure would be described later), a second bias circuit (the structure would be described later) and a parasitic capacitor Cp2. The resistor R2 and the first capacitor C1 are connected in parallel between the node N3 and a node N4. The first bias circuit is coupled to the node N4 and includes a resistor R3, a resistor R4, a resistor R5, a switching unit SW4 and a switching unit SW5. The resistor R3 is coupled to the node N4. The resistor R4 is coupled between the resistor R3 and the switching unit SW4. The switching unit SW4 is coupled between the resistor R4 and a power source voltage Vdd (e.g. 3.3 V). The resistor R5 is coupled between the resistor R3 and the switching unit SW5. The switching unit SW5 is coupled between the resistor R5 and the power source voltage Vdd. In some embodiments, the resistance of the resistor R4 (e.g. 2 kΩ) is smaller than the resistance of the resistor R5 (e.g. 8.5 kΩ). The second bias circuit is coupled to the node N3 and includes a resistor R6 and a switching unit SW6. The resistor R6 is coupled between the node N3 and the switching unit SW6. The switching unit SW6 is coupled between the resistor R6 and the ground voltage Gnd and is configured to be selectively turned on according to a control signal CS6 (as shown in FIG. 1) emitted by the processing circuit 400. The parasitic capacitor Cp1 is coupled between the node N4 and the ground voltage Gnd.

The first I/O circuit 140 includes a parasitic capacitor Cp3, an electrostatic discharge protection (ESD) circuit (the structure would be described later) and a first I/O end 101. The first I/O end 101 is coupled to the node N1, and a node N7 and a node N8 are set on the line that connected the node N1 and the first I/O end 101. The parasitic capacitor Cp3 is coupled between the node N7 and the ground voltage Gnd. The ESD circuit includes a first diode D1 and a second diode D2. The anode end of the first diode D1 is coupled to the node N8, and the cathode end of the first diode D1 is coupled to the common mode voltage Vcm. The anode end of the second diode D2 is coupled to the ground voltage Gnd, and the cathode end of the second diode D2 is coupled to the node N8. The ESD circuit is configured to perform the electrostatic discharge protection for the electric units in the transceiving circuit 10.

The short-circuited circuit 300 includes a switching unit SW7. The switching unit SW7 is configured to be selectively turned on/off according to a control signal CS7 (as shown in FIG. 1) emitted by the processing circuit 400, so as to conduct or block the electrical connection between the node N1 and the node N5 of the negative end circuit 200 (as shown in FIG. 1).

During the operation, the transceiving circuit 10 can be switched into a transmitting mode (as the operation illustrated in FIG. 2) or into a receiving mode (as the operation illustrated in FIG. 3) by the first switching circuit 130 and the second switching circuit 230.

In some embodiments, when the transceiving circuit 10 is operated in the transmitting mode, the processing circuit 400 outputs the control signals CS1-CS7 to the switching units SW1-SW7 of the positive end circuit 100 respectively. As shown in FIG. 2, the switching unit SW1 is turned off according to the control signal CS1, so as to disconnect the node N1 with the node N3. The switching unit SW2 is turned on according to the control signal CS2, and the switching unit SW3 is turned off according to the control signal CS3, so that the resistor R1 receives the common mode voltage Vcm. The switching unit SW7 is turned off according to the control signal CS7, so as to disconnect the node N1 with the node N5 of the negative end circuit 200. In such way, the first output signal Vo1 from a front-end circuit (not shown, e.g., serializer) is received by the first transmitting circuit 110 and is transmitted from the node N2 to the node N1 through the second inductor L2, so that the transceiving circuit 10 is allowed to output the first output signal Vo1 through the first I/O end 101 (as shown in the arrow direction of FIG. 2). The operation that the negative end circuit 200 emits the second output signal Vo1 is similar to those of the positive end circuit 100, and therefore the descriptions thereof are omitted herein.

Figure 3:
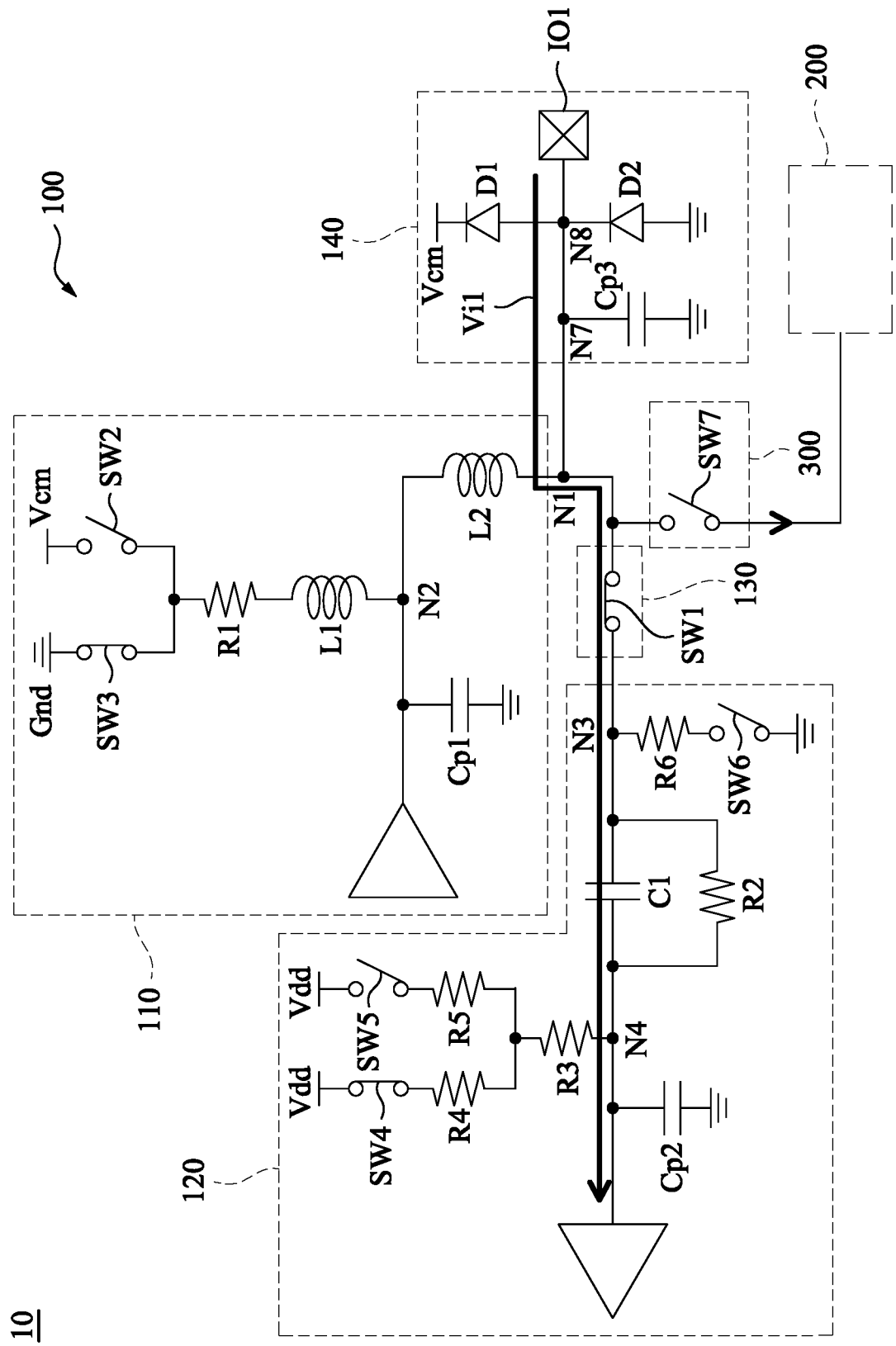
FIG. 3 is an equivalent circuit diagram of the transceiving circuit operated in a receiving mode in accordance with some embodiments of the present disclosure.

In some embodiments, when the transceiving circuit 10 is operated in the receiving mode, the processing circuit 400 outputs the control signals CS1-CS7 to the switching units SW1-SW7 of the positive end circuit 100 respectively. As shown in FIG. 3, the switching unit SW1 is turned on according to the control signal CS1, so as to connect the node N1 with the node N3. The switching unit SW2 is turned off according to the control signal CS2, and the switching unit SW3 is turned on according to the control signal CS3, so that the resistor R1 receives the ground voltage Gnd. The switching unit SW4 is turned on according to the control signal CS4, and the switching unit SW5 is turned off according to the control signal CS5, so that the resistor R3 and the resistor R4 receive the power source voltage Vdd. The switching unit SW6 is turned off according to the control signal CS6, so that the resistor R6 is configured to be an open circuit. The switching unit SW7 is turned off according to the control signal CS7, so as to disconnect the node N1 with the node N5 of the negative end circuit 200. At this time, the voltage level of the node N4 of the first receiving circuit 120 is maintained at an operation voltage (e.g. 0.7 V). In such way, the first input signal Vi1 is received by the first I/O end 101 of the first transmitting circuit 10 and is transmitted from the node N1 to the node N3 through the first switching circuit 130, so as to be transmitted by the first receiving circuit 120 (e.g., transmitted to a back-end circuit of the first receiving circuit 120). The first input signal Vi1 entering the first receiving circuit 120 is transmitted from the node N3, through the first capacitor C1 and the resistor R2 and to the node N4, so as to be outputted by the first receiving circuit 120 (as shown in the arrow direction of FIG. 3). The operation that the negative end circuit 200 receives the second input signal Vi2 is similar to those of the positive end circuit 100, and therefore the descriptions thereof are omitted herein.

When the transceiving circuit 10 is operated in the transmitting mode (as the operation illustrated in FIG. 2), the first inductor L1 can efficiently block the parasitic effect generated by the resistor R1, so as to increase the transmitting bandwidth (e.g. 28.9 GHz) of the transceiving circuit 10. When the transceiving circuit 10 is operated in the receiving mode (as the operation illustrated in FIG. 3), the second inductor L2 can efficiently block the parasitic effect generated by the first transmitting circuit 110, so as to increase the receiving bandwidth (e.g. 14.96 GHz) of the transceiving circuit 10. In the present embodiment, the sum of the inductance of the first inductor L1 and the inductance of the second inductor L2 can be, for example but not limited to, 1 nH. It is noted that the transmitting bandwidth and the receiving bandwidth of the transceiving circuit 10 can be adjusted by adjusting the inductance of the first inductor L1 and the inductance of the second inductor L2. For example, when the inductance of the first inductor L1 is increased (e.g., increased from 0.5 nH to 0.7 nH) and the inductance of the second inductor L2 is decreased (e.g., decreased from 0.5 nH to 0.3 nH), the transmitting bandwidth of the transceiving circuit 10 is increased. If the adjustment is applied in a reversed manner (e.g., decrease the inductance of the first inductor L1 and increase the inductance of the second inductor L2), the receiving bandwidth of the transceiving circuit 10 is increased.

Figure 4:
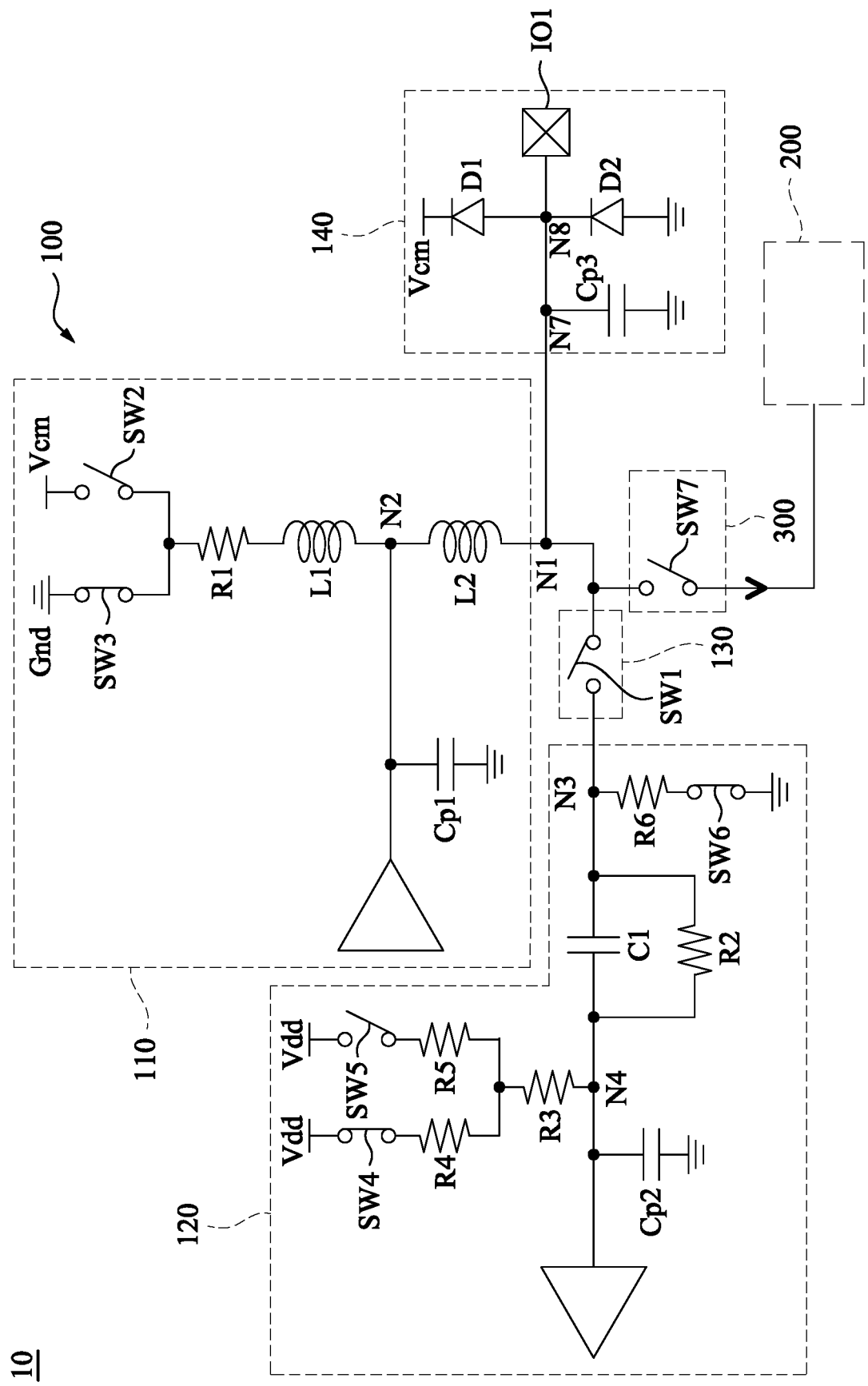
FIG. 4 is an equivalent circuit diagram of the transceiving circuit operated in a receiver offset calibration mode in accordance with some embodiments of the present disclosure.
Figure 5:
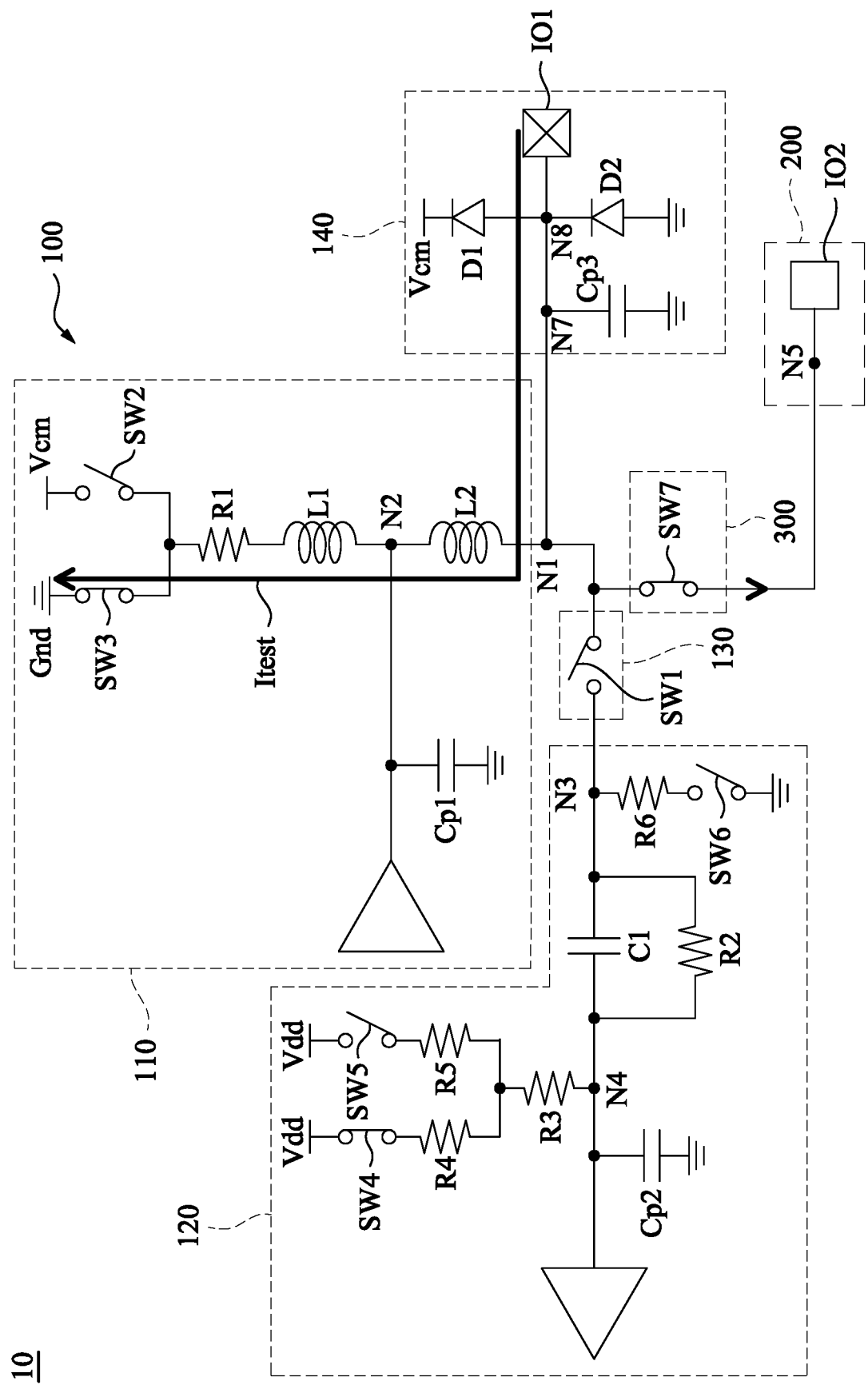
FIG. 5 is an equivalent circuit diagram of the transceiving circuit operated in a transmitter equivalent impedance measurement mode in accordance with some embodiments of the present disclosure.

In addition, during the test of the transceiving circuit 10, the transceiving circuit 10 can further be operated in a receiver offset calibration mode (as the operation illustrated in FIG. 4) or a transmitter equivalent impedance measurement mode (as the operation illustrated in FIG. 5).

In some embodiments, when the transceiving circuit 10 is operated in the receiver offset calibration mode, the processing circuit 400 outputs the control signals CS1-CS7 to the switching units SW1-SW7 of the positive end circuit 100 respectively. Referring to FIG. 4, the switching unit SW1 is turned off according to the control signal CS1, so as to disconnect the node N1 with the node N3. The switching unit SW4 is turned on according to the control signal CS4, and the switching unit SW5 is turned off according to the control signal CS5, so that the resistor R3 and the resistor R4 receive the power source voltage Vdd. The switching unit SW16 is turned on according to the control signal CS6, so that the resistor R6 receives the ground voltage Gnd. The switching unit SW7 is turned off according to the control signal CS7, so as to disconnect the node N1 with the node N5 of the negative end circuit 200. At this time, since the resistor R6 has the same resistance as the resistor R1 (e.g. 45Ω), even though the node N1 and the node N3 are disconnected, the equivalent impedance measured from the node N3 towards the ground voltage Gnd is substantially equal to the equivalent impedance measured when the transceiving circuit 10 is operated in the receiving mode. In such way, the voltage level of the node N4 of the first receiving circuit 120 is still maintained at the operation voltage (e.g. 0.7 V), such that an external device (not shown) is allowed to calibrate an offset voltage between the output end of the first receiving circuit 120 and the input end of the back-end circuit (not shown, e.g., Continuous Time Linear Equalizer (CTLE)) coupled to the first receiving circuit 120. The operation of the negative end circuit 200 is similar to those of the positive end circuit 100, and therefore the descriptions thereof are omitted herein.

In another embodiment, if the receiver offset calibration mode is removed from the transceiving circuit 10, the second bias circuit (including the resistor R6 and the switching unit SW6) of the first receiving circuit 120 can be omitted.

In some embodiments, when the transceiving circuit 10 is operated in the transmitter equivalent impedance measurement mode, the processing 400 outputs the control signals CS1-CS7 to the switching units SW1-SW7 of the positive end circuit 100 respectively. Referring to FIG. 5, the switching unit SW1 is turned off according to the control signal CS1, so as to disconnect the node N1 with the node N3. The switching unit SW2 is turned off according to the control signal CS2, and the switching unit SW3 is turned on according to the control signal CS3, so that the resistor R1 receives the ground voltage Gnd. The switching unit SW4 is turned on according to the control signal CS4, and the switching unit SW5 is turned off according to the control signal CS5, so that the resistor R3 and the resistor R4 receive the power source voltage Vdd. The switching unit SW6 is turned off according to the control signal CS6, so that the resistor R6 is configured to be an open circuit. The switching unit SW7 is turned on according to the control signal CS7, so as to conduct the node N1 and the node N5 of the negative end circuit 200. For measuring the equivalent impedance of the first transmitting circuit 110, a test current Itest (e.g. 10 mA) is inputted through the first I/O end 101 by the operator. Because of the disconnection between the node N1 and the node N3 and the high impedance of the negative end circuit 200, the test current Itest passes through the first I/O circuit 140 to the node N1 and sequentially passes through the second inductor L2, the first inductor L1 and the resistor R1 to the ground voltage Gnd, such that a test voltage is generated at the node N1. Since the node N1, the node N5 of the negative end circuit 200 and a second I/O end 102 of the negative end circuit 200 are coupled together, the operator can obtain the test voltage by measuring the voltage level of the second I/O end 102. Also, the operator can calculate the equivalent impedance of the first transmitting circuit 110 with Ohm's law, so that the impedance matching between other circuits and the first transmitting circuit 110 can be facilitated.

Figure 6:
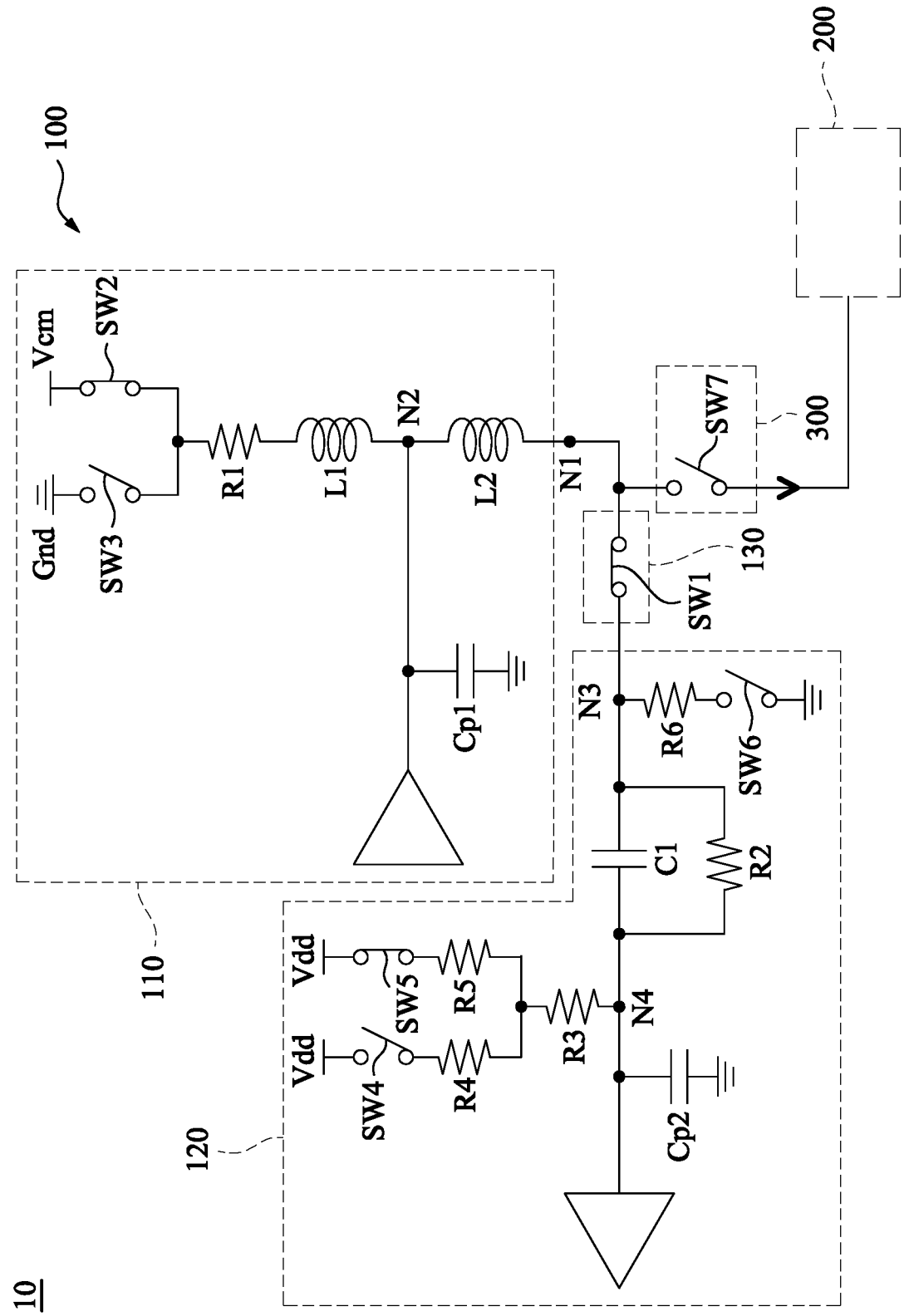
FIG. 6 is an equivalent circuit diagram of the transceiving circuit operated in a loopback mode in accordance with some embodiments of the present disclosure.

Referring to FIG. 6, FIG. 6 depicts the equivalent circuit of the transceiving circuit 10 before the transceiving circuit 10 is packaged. Before the transceiving circuit 10 is packaged, the first I/O circuit 140 and the second I/O circuit 240 of the transceiving circuit 10 can be omitted. At this time, the unpackaged transceiving circuit 10 can further be operated in a loopback mode.

In some embodiments, when the transceiving circuit 10 is operated in the loopback mode, the processing 400 outputs the control signals CS1-CS7 to the switching units SW1-SW7 of the positive end circuit 100 respectively. The switching unit SW1 is turned on according to the control signal CS1, so as to connect the node N1 with the node N3. The switching unit SW2 is turned on according to the control signal CS2, and the switching unit SW3 is turned off according to the control signal CS3, so that the resistor R1 receives the common mode voltage Vcm. The switching unit SW4 is turned off according to the control signal CS4, and the switching unit SW5 is turned on according to the control signal CS5, so that the resistor R3 and the resistor R5 receive the power source voltage Vdd (so that the resistor R5 can divide the voltage to maintain the voltage level of the node N4 at, e.g., 0.7 V). The switching unit SW6 is turned off according to the control signal CS6, so that the resistor R6 is configured to be an open circuit. The switching unit SW7 is turned off according to the control signal CS7, so as to disconnect the node N1 with the node N5. In such way, in the preliminary stage of chip manufacturing, the operator can transmit the signal from the first transmitting circuit 110 to the first receiving circuit 120, so as to ensure whether both the first transmitting circuit 110 and the first receiving circuit 120 function normally. The operation of the negative end circuit 200 is similar to those of the positive end circuit 100, and therefore the descriptions thereof are omitted herein.

It is understood that, in the above embodiments, the descriptions are that the processing circuit 400 outputs the control signals CS1-CS7 to the switching units SW1-SW7 of the positive end circuit 100 when controlling the transceiving circuit 10. In the practical operation, when controlling the transceiving circuit 10, the processing circuit 400 can output only a few of the control signals CS1-CS7 to a few of the switching units SW1-SW7, so as to switch between a variety of modes (the operation of the negative end circuit 200 is similar thereto).

In sum, by the structure of the first switching circuit 130 and the second switching circuit 230, the transceiving circuit 10 of the present disclosure can integrate the first transmitting circuit 110, the second transmitting circuit 210, the first receiving circuit 120 and the second receiving circuit 220, so as to meet the requirement for transmitting and receiving signal and to save the hardware cost also. The inductor structure (e.g., the first inductor L1 and the second inductor L2 of the first transmitting circuit 110) in the transceiving circuit 10 can efficiently reduce the parasitic effect generated by the electric units of the transceiving circuit 10, so as to increase the transmitting bandwidth and the receiving bandwidth of the transceiving circuit 10. Furthermore, the operator can have more convenience to test the transceiving circuit 10 by the design of the first switching circuit 130 and the second switching circuit 230, the bias circuits of the first receiving circuit 120 and the second receiving circuit 220 (e.g., the resistor R6 and the switching unit SW6 of the first receiving circuit 120) and the short-circuited circuit 300.

Although the present disclosure has been described in considerable detail with reference to certain embodiments thereof, other embodiments are possible. Therefore, the spirit and scope of the appended claims should not be limited to the description of the embodiments contained herein. It is apparent to those skilled in the art that various modifications and variations can be made to the structure of the present disclosure without departing from the scope or spirit of the invention. In view of the foregoing, it is intended that the present invention cover modifications and variations of this invention provided they fall within the scope of the following claims.

What is claimed is:
1. A transceiving circuit, comprising:
a first transmitting circuit comprising a first inductor and a second inductor, wherein the second inductor is coupled between a first node and a second node, and an end of the first inductor is coupled to the second node;
a first receiving circuit coupled to a third node;
a first switching circuit coupled to the first transmitting circuit through the first node and coupled to the first receiving circuit through the third node, wherein the first switching circuit is configured to connect or disconnect the first node with the third node; and
a processing circuit coupled to the first transmitting circuit, the first receiving circuit and the first switching circuit, wherein when the transceiving circuit is operated in a transmitting mode, the processing circuit is configured to control the first switching circuit to disconnect the first node with the third node,
when the transceiving circuit is operated in a receiving mode, the processing circuit is configured to control the first switching circuit to connect the first node with the third node.

2. The transceiving circuit of claim 1, wherein when the transceiving circuit is operated in the transmitting mode, a first output signal received by the first transmitting circuit is transmitted from the second node to the first node through the second inductor, so as to be outputted by the transceiving circuit.

3. The transceiving circuit of claim 1, wherein when the transceiving circuit is operated in the receiving mode, the transceiving circuit receives a first input signal and transmits the first input signal from the first node to the third node, so as to allow the first receiving circuit to receive the first input signal.

4. The transceiving circuit of claim 1, wherein a first switching unit of the first switching circuit is configured to be controlled by the processing circuit to be selectively turned on/off, so as to connect or block the first node with the third node.

5. The transceiving circuit of claim 1, wherein a first resistor of the first transmitting circuit is coupled to another end of the first inductor.

6. The transceiving circuit of claim 5, wherein a first switching unit of the first transmitting circuit is coupled between the first resistor of the first transmitting circuit and a common mode voltage and is configured to be controlled by the processing circuit to be selectively turned on/off, and a second switching unit of the first transmitting circuit is coupled between the first resistor of the first transmitting circuit and a ground voltage and is configured to be controlled by the processing circuit to be selectively turned on/off.

7. The transceiving circuit of claim 6, wherein when the transceiving circuit is operated in the transmitting mode, the first switching unit of the first transmitting circuit is turned on, and the second switching unit of the first transmitting circuit is turned off, so that the first resistor of the first transmitting circuit receives the common mode voltage.

8. The transceiving circuit of claim 6, wherein when the transceiving circuit is operated in the receiving mode, the first switching unit of the first transmitting circuit is turned off, and the second switching unit of the first transmitting circuit is turned on, so that the first resistor of the first transmitting circuit receives the ground voltage.

9. The transceiving circuit of claim 1, wherein a first resistor of the first receiving circuit and a first capacitor of the first receiving circuit are connected in parallel between the third node and a fourth node.

10. The transceiving circuit of claim 9, wherein the first receiving circuit further comprises a first bias circuit coupled to the fourth node.

11. The transceiving circuit of claim 10, wherein a first resistor of the first bias circuit is coupled between the fourth node and a second resistor of the first bias circuit, and a first switching unit of the first bias circuit is coupled between the second resistor of the first bias circuit and a power source voltage.

12. The transceiving circuit of claim 11, wherein a third resistor of the first bias circuit is coupled to the first resistor of the first bias circuit, and a second switching unit of the first bias circuit is coupled between the third resistor of the first bias circuit and the power source voltage.

13. The transceiving circuit of claim 10, wherein the first receiving circuit further comprises a second bias circuit coupled to the third node.

14. The transceiving circuit of claim 13, wherein a first resistor of the second bias circuit is coupled to the third node, and a first switching unit of the second bias circuit is coupled between the first resistor of the second bias circuit and a ground voltage and is configured to be controlled by the processing circuit to be selectively turned on/off.

15. The transceiving circuit of claim 14, wherein when the transceiving circuit is operated in a receiver offset calibration mode, the first switching unit of the second bias circuit is turned on, so that the first resistor of the second bias circuit receives the ground voltage and the fourth node is maintained at an operation voltage.

16. The transceiving circuit of claim 1, further comprising a first input/output circuit coupled to the first node, wherein the first input/output circuit comprises an electrostatic discharge protection circuit and an input/output end.

17. The transceiving circuit of claim 1, further comprising a short-circuited circuit coupled between the first node and a fourth node and configured to conduct or block the first node and the fourth node.

18. The transceiving circuit of claim 17, wherein a first switching unit of the short-circuited circuit is configured to be controlled by the processing circuit to be selectively turned on/off, so as to connect or disconnect the first node with the fourth node.

19. The transceiving circuit of claim 17, further comprising a second transmitting circuit coupled to the fourth node.

20. The transceiving circuit of claim 19, further comprising a second switching circuit and a second receiving circuit, wherein the second receiving circuit is coupled to the second switching circuit through a fifth node, the second switching circuit is coupled to the second transmitting circuit through the fourth node, and the second switching circuit is configured to connect or disconnect the fourth node with the fifth node.

\* \* \* \* \*